(No Model.)

J. B. FRAZER.
SULKY.

No. 263,158. Patented Aug. 22, 1882.

WITNESSES:
W. W. Hollingsworth
H. B. Brower

INVENTOR:
J. B. Frazer
BY
ATTORNEYS.

UNITED STATES PATENT OFFICE.

JOSEPH B. FRAZER, OF RUSHVILLE, INDIANA, ASSIGNOR TO HIMSELF AND JOHN CARROLL, OF SAME PLACE.

SULKY.

SPECIFICATION forming part of Letters Patent No. 263,158, dated August 22, 1882.

Application filed June 22, 1882. (No model.)

*To all whom it may concern:*

Be it known that I, JOSEPH B. FRAZER, of Rushville, in the county of Rush and State of Indiana, have invented a new and useful Improvement in Sulkies; and I do hereby declare that the following is a full, clear, and exact description of the same.

This invention relates to certain improvements in that class of sulkies or two-wheel vehicles in which the seat is provided with springs to obviate the unpleasant jolting, &c., accompanying a drive over a rough road; and the invention consists in the peculiar construction and arrangement and combination of parts, all as hereinafter fully set forth, reference being had to the accompanying drawings, which form a part of this specification, and in which—

Figure 1:
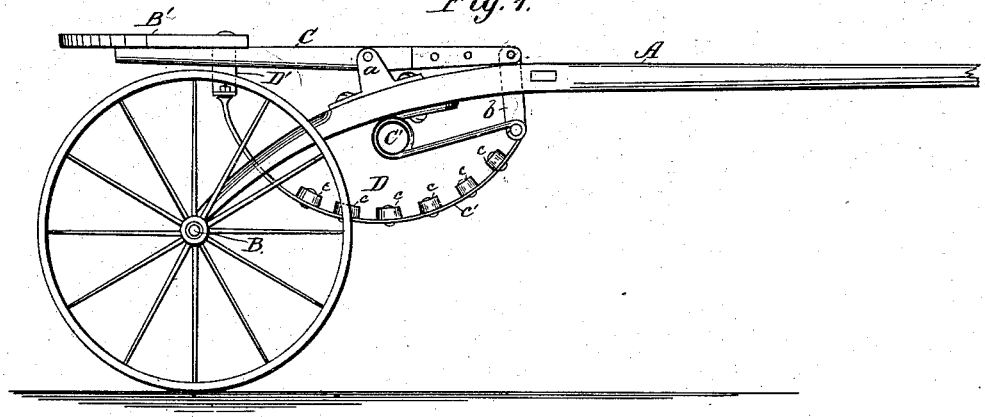
Figure 2:
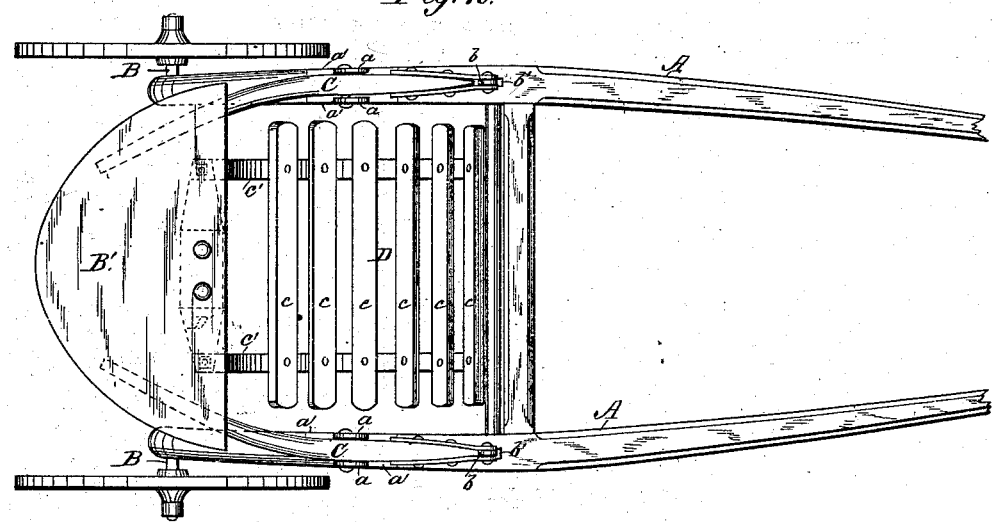
Figure 3:
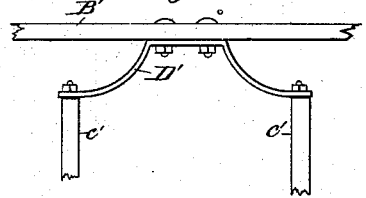

Figure 1 is a side elevation of my improved sulky. Fig. 2 is a plan view of the same, and Fig. 3 is a detail view.

In the drawings, A A denote the thills, secured to the axle B in any well-known manner to form a support for the seat B'. The seat is bolted or otherwise suitably secured to the rear ends of two bars, C, pivoted between ears $a$ of the plate $a'$, secured on top of the thills A. To the forward ends of the bars C is connected the upper end of links $b$, which extend down through apertures $b'$ in the thills and connect with springs C', secured to the under side of the thills, said links $b$ being also connected and secured to the front slat of the foot-rest D, thus forming a support for this end of the foot-rest, as shown by the drawings. The foot-rest D is formed of wooden slats $c$, held by flat iron or steel bars $c'$, the rear ends of the latter extending up under the seat B', and secured on their respective sides to the ends of a bow or other suitable spring, D', bolted to the bottom of the seat B', as shown. By supporting the foot-rest and seat upon springs and connecting them together, as herein shown and described, one partakes of the movement of the other, thus obviating the unpleasant jolting movement where the seat is rigid upon the thills.

The construction of this invention is such as to produce a compact, durable, and sightly two-wheel vehicle, possessing, among other superior qualities over the ordinary sulky, smooth and easy riding over rough roads.

It is of course understood that the construction or peculiar form of the several parts may be varied as desired without departing from this invention.

Having thus fully described my invention, what I claim, and desire to secure by Letters Patent, is—

1. The combination of the thills A, seat B', bars C, plate $a'$, provided with ears $a$, links $b$, and springs C', substantially as shown and described.

2. The combination, with the thills A, seat B, bars C, apertured plates $a'$, and links $b$, of the foot-rest D and spring D', substantially as and for the purpose set forth.

3. The combination of the thills A, seat B', bars C, plate $a'$, provided with ears $a$, links $b$, and springs C', with the foot-rest D, constructed substantially as described, and spring D', all arranged as shown and described.

JOSEPH B. FRAZER.

Witnesses:
LEWIS D. WOOCOCK,
GEORGE A. MYERS.